US012522715B2

(12) United States Patent
Sehata et al.

(10) Patent No.: US 12,522,715 B2
(45) Date of Patent: Jan. 13, 2026

(54) ADHESION PREVENTING AGENT COMPOSITION FOR UNVULCANIZED RUBBER, ADHESION PREVENTING AGENT COMPOSITION AQUEOUS DISPERSION FOR UNVULCANIZED RUBBER, AND UNVULCANIZED RUBBER

(71) Applicant: LION SPECIALTY CHEMICALS CO., LTD., Tokyo (JP)

(72) Inventors: Shiro Sehata, Tokyo (JP); Daisuke Nagato, Tokyo (JP)

(73) Assignee: LION SPECIALTY CHEMICALS CO., LTD., Tokyo (JP)

( * ) Notice: Subject to any disclaimer, the term of this patent is extended or adjusted under 35 U.S.C. 154(b) by 490 days.

(21) Appl. No.: 17/982,496

(22) Filed: Nov. 7, 2022

(65) Prior Publication Data

US 2023/0151183 A1    May 18, 2023

(30) Foreign Application Priority Data

Nov. 18, 2021 (JP) .................................. 2021-188227
Aug. 25, 2022 (JP) .................................. 2022-134499

(51) Int. Cl.
| | |
|---|---|
| *C08K 5/098* | (2006.01) |
| *C08F 116/06* | (2006.01) |
| *C08F 120/06* | (2006.01) |
| *C08G 65/08* | (2006.01) |
| *C08K 5/42* | (2006.01) |

(52) U.S. Cl.
CPC ............ *C08K 5/098* (2013.01); *C08F 116/06* (2013.01); *C08F 120/06* (2013.01); *C08G 65/08* (2013.01); *C08K 5/42* (2013.01); *C08K 2201/014* (2013.01)

(58) Field of Classification Search
CPC ......... C08K 5/098; C08K 5/42; C08F 116/06; C08F 120/06; C08G 65/08
See application file for complete search history.

(56) References Cited

U.S. PATENT DOCUMENTS

2008/0167597 A1*  7/2008  Dougherty ............. C08L 53/00
                                                              215/11.1

FOREIGN PATENT DOCUMENTS

| CN | 104109326 A | * | 10/2014 | ................. C08J 5/18 |
| CN | 110922703 A | * | 3/2020 | ............. C08L 29/04 |
| JP | S50149770 | | 12/1975 | |
| JP | S6232127 | | 2/1987 | |
| JP | 2009161667 | | 7/2009 | |
| JP | 2013001720 | | 1/2013 | |

OTHER PUBLICATIONS

English machine translation of CN 104109326A. (Year: 2014).*
English machine translation of CN 110922703A. (Year: 2020).*

* cited by examiner

*Primary Examiner* — John E Uselding
(74) *Attorney, Agent, or Firm* — JCIPRNET

(57) ABSTRACT

The disclosure provides an adhesion preventing agent composition for unvulcanized rubber of which the viscosity is not too high and which allows both lubricity and dispersibility to be obtained in addition to excellent adhesion preventing properties. To achieve the above objective, an adhesion preventing agent composition for unvulcanized rubber of the disclosure includes the following components (A) to (C) and water, wherein the component (B) includes the following components (B1) and (B2), and wherein the mass ratio (B1)/(B2) of the following component (B1) and the following component (B2) is in a range of 1 to 20:
- (A) a water-soluble polymer,
- (B) a metallic soap,
- (C) a surfactant,
- (B1) at least one metallic soap selected from the group consisting of calcium fatty acid and lithium fatty acid, and
- (B2) at least one metallic soap selected from the group consisting of zinc fatty acid, magnesium fatty acid, and aluminum fatty acid.

6 Claims, No Drawings

ADHESION PREVENTING AGENT COMPOSITION FOR UNVULCANIZED RUBBER, ADHESION PREVENTING AGENT COMPOSITION AQUEOUS DISPERSION FOR UNVULCANIZED RUBBER, AND UNVULCANIZED RUBBER

CROSS-REFERENCE TO RELATED APPLICATION

This application claims the priority benefit of Japan Application No. 2021-188227, filed on Nov. 18, 2021 and Application No. 2022-134499, filed on Aug. 25, 2022. The entirety of the above-mentioned patent applications are hereby incorporated by reference herein and made a part of this specification.

BACKGROUND

Technical Field

The disclosure relates to an adhesion preventing agent composition for unvulcanized rubber, an adhesion preventing agent composition aqueous dispersion for unvulcanized rubber, and unvulcanized rubber.

Description of Related Art

In places where rubber is produced and processed, in order to prevent adherence of rubber (for example, unvulcanized rubber), an adhesion preventing agent is adhered to a surface of rubber.

As an adhesion preventing agent for rubber, adhesion preventing agents for rubber including an inorganic powder as a main component are widely used. Generally, these agents in the form of an aqueous dispersion can be adhered to a surface of rubber for use (Patent Documents 1 and 2). In addition, various adhesion preventing agents using a water-soluble polymer or the like have been proposed in order to reduce dust derived from an inorganic powder. For example, in Patent Documents 3 and 4, a water-soluble polymer (sodium alginate, CMC, sodium polyacrylate, PVA, or the like), a water-soluble polysaccharide (xanthan gum), and the like are mixed in to increase the viscosity of an aqueous dispersion of an adhesion preventing agent, and adhesion of the adhesion preventing agent to a surface of rubber is improved.

PATENT DOCUMENTS

[Patent Document 1] Japanese Patent Laid-Open No. S50-149770
[Patent Document 2] Japanese Patent Laid-Open No. 2013-001720
[Patent Document 3] Japanese Patent Laid-Open No. S62-032127
[Patent Document 4] Japanese Patent Laid-Open No. 2009-161667

In an adhesion preventing agent composition for unvulcanized rubber, if lubricity is low, when unvulcanized rubber to which the adhesion preventing agent composition for unvulcanized rubber is applied comes into contact with other rubber, metal or the like, it may become less slippery. In addition, in the adhesion preventing agent composition for unvulcanized rubber, if the dispersibility is poor, the adhesion preventing agent composition for unvulcanized rubber may disperse and contaminate the surrounding environment.

In addition, when the viscosity of the adhesion preventing agent composition for unvulcanized rubber is too high, as described above, adhesion to the surface of rubber is improved, but handling properties (ease of handling) may deteriorate due to a decrease in fluidity of the adhesion preventing agent composition for unvulcanized rubber or the like.

Here, the disclosure provides an adhesion preventing agent composition for unvulcanized rubber of which the viscosity is not too high and which allows both lubricity and dispersibility to be obtained in addition to excellent adhesion preventing properties, an adhesion preventing agent composition aqueous dispersion for unvulcanized rubber, and unvulcanized rubber.

SUMMARY

According to an aspect of the disclosure, an adhesion preventing agent composition for unvulcanized rubber of the disclosure includes the following components (A) to (C) and water,
wherein the following component (B) includes the following component (B1) and the following component (B2), and
wherein the mass ratio (B1)/(B2) of the following component (B1) and the following component (B2) is in a range of 1 to 20:
(A) a water-soluble polymer,
(B) a metallic soap,
(C) a surfactant,
(B1) at least one metallic soap selected from the group consisting of calcium fatty acid and lithium fatty acid soaps, and
(B2) at least one metallic soap selected from the group consisting of zinc fatty acid, magnesium fatty acid, and aluminum fatty acid soaps.

An adhesion preventing agent composition aqueous dispersion for unvulcanized rubber of the disclosure includes the adhesion preventing agent composition for unvulcanized rubber of the disclosure and water.

Unvulcanized rubber of the disclosure has the components (A) to (C) in the adhesion preventing agent composition for unvulcanized rubber of the disclosure adhered to a surface of the unvulcanized rubber.

DESCRIPTION OF THE EMBODIMENTS

According to the disclosure, it is possible to provide an adhesion preventing agent composition for unvulcanized rubber of which the viscosity is not too high and which allows both lubricity and dispersibility to be obtained in addition to excellent adhesion preventing properties, an adhesion preventing agent composition aqueous dispersion for unvulcanized rubber, and unvulcanized rubber.

The disclosure will be described below in further detail with reference to examples. However, the disclosure is not limited to the following description.

According to the adhesion preventing agent composition for unvulcanized rubber of the disclosure, as described above, it is possible to obtain both lubricity and dispersibility in addition to excellent adhesion preventing properties. Here, in the disclosure, "lubricity" is defined as a property of lowering frictional resistance occurring in a contact surface when unvulcanized rubber to which an adhesion preventing agent composition for unvulcanized rubber is applied comes in contact with another member (for example, other rubber, metal or the like). In addition, in the disclosure, "dispersibility" is defined as a property of the adhesion preventing agent composition for unvulcanized rubber and its dried product being dispersed. It can be said that, when the dispersibility is weaker (dispersion is less likely), an adhesion preventing agent composition for unvulcanized rubber has better dispersibility. The adhesion preventing agent composition for unvulcanized rubber of the disclosure has, for example, weak dispersibility (dispersion is less unlikely), and thus has excellent handling properties (ease of handling).

Here, in the disclosure, methods of measuring adhesion preventing properties, lubricity, dispersibility and viscosity are not particularly limited, and for example, they can be measured by methods described in examples to be described below.

For example, an adhesion preventing agent composition for unvulcanized rubber of the disclosure may contain 25 to 70 mass % of the component (A), 20 to 60 mass % of the component (B) and 10 to 20 mass % of the component (C) with respect to a total mass 100 mass % of components other than water. Thereby, for example, an adhesion preventing agent for unvulcanized rubber having better adhesion preventing properties and lubricity can be obtained.

In the adhesion preventing agent composition for unvulcanized rubber of the disclosure, for example, the mass ratio (A)/(B) between the component (A) and the component (B) may be in a range of 0.5 to 3. Thereby, for example, an adhesion preventing agent for unvulcanized rubber having a better balance between lubricity and dispersibility can be obtained.

An adhesion preventing treatment method for unvulcanized rubber of the disclosure may be, for example, an adhesion preventing treatment method for unvulcanized rubber including an adhesion preventing treatment process in which an adhesion preventing treatment is performed by adhering the components (A) to (C) in the adhesion preventing agent composition for unvulcanized rubber of the disclosure to the surface of unvulcanized rubber. The adhesion preventing treatment process may be, for example, a process in which an adhesion preventing agent composition for unvulcanized rubber of the disclosure or an adhesion preventing agent composition aqueous dispersion for unvulcanized rubber of the disclosure is adhered to the surface of the unvulcanized rubber and water is additionally volatilized, and thus the components (A) to (C) in the adhesion preventing agent composition for unvulcanized rubber of the disclosure are adhered to the surface of the unvulcanized rubber. More specifically, the adhesion preventing treatment process may include, for example, a process of adhering an adhesion preventing agent composition for unvulcanized rubber in which the adhesion preventing agent composition for unvulcanized rubber of the disclosure is adhered to the surface of unvulcanized rubber and a drying process in which the adhesion preventing agent composition for unvulcanized rubber on the surface of the unvulcanized rubber is dried and a coating is formed on the surface of unvulcanized rubber.

Hereinafter, specific examples of the disclosure will be described below in further detail.

1. Adhesion Preventing Agent Composition for Unvulcanized Rubber

An adhesion preventing agent composition for unvulcanized rubber of the disclosure includes, as described above, the following components (A) to (C) and water, wherein the following component (B) includes the following component (B1) and the following component (B2), wherein the mass ratio (B1)/(B2) between the following component (B1) and the following component (B2) is in a range of 1 to 20:

(A) a water-soluble polymer,
(B) a metallic soap,
(C) a surfactant,
(B1) at least one metallic soap selected from the group consisting of calcium fatty acid and lithium fatty acid, and
(B2) at least one metallic soap selected from the group consisting of zinc fatty acid, magnesium fatty acid, and aluminum fatty acid.

When the adhesion preventing agent composition for unvulcanized rubber of the disclosure has the above composition, the viscosity is not too high, and in addition to excellent adhesion preventing properties, both lubricity and dispersibility can be obtained.

Hereinafter, components of the adhesion preventing agent composition for unvulcanized rubber of the disclosure will be described.

1-1. Component (A): Water-Soluble Polymer

As described above, the component (A) is a water-soluble polymer. In the adhesion preventing agent composition for unvulcanized rubber of the disclosure, the component (A), that is a water-soluble polymer (hereinafter referred to as a "water-soluble polymer (A)" in some cases), is a polymer compound which is put into water or put into water and then heated and thus can disperse or dissolve in the adhesion preventing agent composition for unvulcanized rubber of the disclosure. Therefore, for example, a coating effect on unvulcanized rubber is obtained and an adhesion preventing effect is obtained. Thus, the component (A) acts, for example, as a film-forming agent. In addition, for example, when the component (A) and the component (B) are used in combination, adhesion preventing properties are exhibited.

In the adhesion preventing agent composition for unvulcanized rubber of the disclosure, the content of the water-soluble polymer (A) is not particularly limited, and for example, with respect to a total mass of components (solid content) other than water, the lower limit may be 25 mass % or more, for example, 30 mass % or more, 40 mass % or more or 50 mass % or more, and may be, for example, 70 mass % or less, 60 mass % or less, 40 mass % or less or 35 mass % or less. When the content of the water-soluble polymer (A) with respect to a total mass of components other than water is 25 mass % or more, for example, a coating effect on unvulcanized rubber is obtained. In addition, when the content of the water-soluble polymer (A) with respect to a total mass of components other than water is 70 mass % or less, the adhesion preventing agent composition for unvulcanized rubber of the disclosure has, for example, excellent drying properties, and can be dried quickly.

The water-soluble polymer (A) may be, for example, a water-soluble polymer having a viscosity of 3 to 6,000 mPa·s at 25° C. in an aqueous solution containing 2 mass % of the water-soluble polymer (A). When a water-soluble polymer having a viscosity of 3 mPa·s or more at 25° C. in the 2 mass % aqueous solution is used, for example, an effect of increasing the amount of adhesion to unvulcanized rubber is obtained. When a water-soluble polymer having a viscosity of 6,000 mPa·s or less in the 2 mass % aqueous solution is used, for example, an effect of having excellent drying properties is obtained. The viscosity of the 2 mass % aqueous solution may be, for example, 10 mPa·s or more, 40 mPa·s or more, 80 mPa·s or more or 100 mPa·s or more, and may be 5,500 mPa·s or less, 5,000 mPa·s or less, 4,500 mPa·s or less, 4,000 mPa·s or less, 300 mPa·s, 200 mPa·s or less or 100 mPa·s or less.

The water-soluble polymer (A) is not particularly limited, and may be, for example, a polymer having a lower limit of solubility with respect to 100 g of water at 25° C. which is 1 g or more, 10 g or more, or 50 g or more. In addition, in the disclosure, the "polymer" is not particularly limited, and may be a polymer having a lower limit of a mass average molecular weight of, for example, 1,000 or more, 5,000 or more, or 10,000 or more, and an upper limit of a mass average molecular weight thereof is not particularly limited, and may be, for example, 500,000 or less.

The type of the water-soluble polymer (A) is not particularly limited, and one type may be used alone or a plurality of types may be used in combination. The water-soluble polymer (A) may be, for example, a synthetic water-soluble polymer or a natural water-soluble polymer. The "synthetic water-soluble polymer" may be, for example, obtained by artificially synthesizing a polymer having a chemical structure that is not found in nature or artificially synthesizing a polymer having a chemical structure found in nature. In addition, the "natural water-soluble polymer" may be, for example, obtained by extracting or generating a polymer having a chemical structure found in nature from nature. The synthetic water-soluble polymer is not particularly limited, and examples thereof include carboxymethylcellulose (CMC), alkylcellulose, hydroxy alkylcellulose, hydroxyalkyl alkylcellulose, polyacrylic acid, sodium polyacrylate, polyacrylamide, polyvinyl alcohol (PVA), polyvinylpyrrolidone, polyethylene glycol, polyethylene oxide, a water-soluble urethane resin, a water-soluble melamine resin, a water-soluble epoxy resin, a water-soluble butadiene resin, and a water-soluble phenolic resin. The natural water-soluble polymer is not particularly limited, and examples thereof include proteins, xanthan gum, guar gum, welan gum, locust bean gum, diutan gum, tamarind gum, tamarind seed gum, tragacanth gum, gum arabic, carrageenan, rhamsan gum, succinoglycan, tara gum, gellan gum, karaya gum, pectin, alginic acid derivatives, and cellulose ethers.

The component (A) is preferably polyvinyl alcohol, carboxymethylcellulose (CMC), alkylcellulose, hydroxy alkylcellulose, hydroxyalkyl alkylcellulose, polyacrylic acid, sodium polyacrylate, starches, mannan, alginic acids, natural gums, proteins, polyvinylpyrrolidone, polyethylene glycol, polyethylene oxide, a polyacrylamide resin, a water-soluble urethane resin, a water-soluble melamine resin, a water-soluble epoxy resin, a water-soluble butadiene resin, a water-soluble phenolic resin or the like, more preferably at least one selected from the group consisting of polyvinyl alcohol (PVA), CMC, polyacrylic acid, sodium polyacrylate, methyl cellulose, hydroxyethyl cellulose, and hydroxypropyl methylcellulose, and still more preferably at least one selected from the group consisting of PVA, hydroxypropyl methylcellulose and methyl cellulose. The viscosity of CMC is preferably 10 to 100,000 mPa·s, more preferably 100 to 100,000 mPa·s, and still more preferably 200 to 90,000 mPa·s in terms of viscosity of 2 mass % aqueous solution. The viscosity of PVA is preferably 2 to 500 mPa·s, more preferably 5 to 400 mPa·s, and still more preferably 10 to 200 mPa·s in terms of viscosity of the 4 mass % aqueous solution. In order to increase the amount of adhesion preventing agent composition for unvulcanized rubber of the disclosure adhered to unvulcanized rubber, it is preferable that the viscosity of the component (A) be not too low. In order to improve drying properties of the adhesion preventing agent composition for unvulcanized rubber of the disclosure, it is preferable that the viscosity of the component (A) be not too high. Here, in the disclosure, the "adhesion amount" of the adhesion preventing agent composition for unvulcanized rubber is an amount of all components other than water in an adhesion preventing agent composition for unvulcanized rubber, which are adhered to the surface of unvulcanized rubber.

The content (formulation amount) of the component (A) in the adhesion preventing agent composition for unvulcanized rubber of the disclosure not particularly limited, and for example, with respect to a total mass of the adhesion preventing agent composition for unvulcanized rubber of the disclosure, the content may be 1 to 20 mass %, 2 to 20 mass %, 3 to 20 mass %, 4 to 18 mass %, or 5 to 16 mass %. In order to prevent deterioration of handling due to an excessive increase in viscosity of the adhesion preventing agent composition for unvulcanized rubber of the disclosure, it is preferable that the content of the component (A) with respect to a total mass of the adhesion preventing agent composition for unvulcanized rubber of the disclosure do not exceed 20 mass %. In addition, in order to easily form a film after the adhesion preventing agent composition for unvulcanized rubber is applied, the content of the component (A) with respect to a total mass of 100 mass % of components (solid content) other than water is preferably 25 mass % or more. The content of the component (A) with respect to a total mass 100 mass % of components other than water is preferably 25 to 75 mass %, more preferably 28 to 70 mass %, and still more preferably 30 to 65 mass %.

In addition, the component (A) may contain, for example, nonionic cellulose ether (hereinafter referred to as a "component (A2)" in some cases). The component (A2) has, for example, a function of improving adhesion preventing properties due to a thermal gel effect or strengthening of a film itself of the adhesion preventing agent composition for unvulcanized rubber and improving removability of deposits on facilities. Specifically, for example, it is thought that, due to the component (A2), since the adhesion preventing agent composition for unvulcanized rubber of the disclosure is thickened on unvulcanized rubber at a high temperature immediately after kneading, the adhesion of the adhesion preventing agent composition for unvulcanized rubber of the disclosure is improved, and adhesion preventing properties are improved. In addition, for example, when the component (A2) and a component other than the component (A2) (hereinafter referred to as a "component (A1)" in some cases) are used in combination as the component (A), an adhesion preventing agent composition for unvulcanized rubber that is inexpensive and exhibits strong adhesion preventing properties is obtained.

The type of the component (A2) is not particularly limited, and one type may be used alone or a plurality of types may be used in combination. The component (A2) is preferably at least one type selected from the group consisting of alkylcellulose, hydroxy alkylcellulose, and hydroxyalkyl alkylcellulose. In these examples, an alkyl group is not particularly limited, and is, for example, a linear or branched alkyl group having 1 to 3 carbon atoms, and only one type may be used or a plurality of types of alkyl groups may be used in combination. The component (A2) is more preferably hydroxyalkyl methyl cellulose such as hydroxyethyl methyl cellulose, hydroxypropyl methylcellulose, and hydroxybutyl methyl cellulose, alkylcellulose such as methyl cellulose, ethyl cellulose, and ethyl methyl cellulose, and hydroxy alkylcellulose such as hydroxy ethyl cellulose, still more preferably at least one type selected from the group consisting of hydroxypropyl methylcellulose, methyl cellulose, ethyl cellulose, ethyl methyl cellulose, and hydroxyethyl methyl cellulose, and particularly preferably at least one type selected from the group consisting of methyl cellulose, ethyl cellulose, and ethyl methyl cellulose.

When the component (A1) and the component (A2) are used in combination, particularly, a combination of PVA as the component (A1) and at least one type selected from the group consisting of methyl cellulose, ethyl cellulose, ethyl methyl cellulose, and hydroxypropyl methylcellulose as the component (A2) is preferably used because it exhibits strong adhesion preventing properties, which are the effects of the disclosure at low cost.

The content (formulation amount) of the component (A2) in the adhesion preventing agent composition for unvulcanized rubber of the disclosure is not particularly limited, and for example, with respect to a total mass of the adhesion preventing agent composition for unvulcanized rubber of the disclosure, the content is 0.05 to 20 mass %, 0.1 to 15 mass %, 0.2 to 10 mass %, or 0.5 to 6 mass %, and for example, with respect to a total mass of 100 mass % of components (solid content) other than water, the content is 0.1 to 60 mass %. In order to easily form a film after the adhesion preventing agent composition for unvulcanized rubber is applied, the content of the component (A2) with respect to a total mass 100 mass % of components other than water is preferably 0.5 to 50 mass % and more preferably 1 to 40 mass %. In order to prevent deterioration of handling due to an excessive increase in viscosity of the adhesion preventing agent composition for unvulcanized rubber of the disclosure, the content of the component (A2) with respect to a total mass of the adhesion preventing agent composition for unvulcanized rubber of the disclosure preferably does not exceed 20 mass %.

The molar degree of substitution (MS) of the component (A2) is not particularly limited, and is preferably 0.1 to 0.5, more preferably 0.1 to 0.45, and still more preferably 0.1 to 0.4. Here, the molar degree of substitution (MS) is defined as an average number of moles of bonded hydroxypropoxy groups and hydroxyethoxy groups per glucose ring unit of cellulose in the molecule of the component (A2). For example, in the case of methyl cellulose, since the number of hydroxypropoxy groups and hydroxyethoxy groups bonded is 0, the molar degree of substitution (MS) is "0."

The degree of substitution (DS) per glucose of the component (A2) is not particularly limited, and is preferably 1.0 to 4.0, more preferably 1.0 to 3.5, and still more preferably 1.0 to 3.0. Here, the degree of substitution (DS) is defined as the average number of hydroxyl groups substituted with methoxy groups per glucose ring unit of cellulose in the molecule of the component (A2).

The viscosity of the component (A2) is not particularly limited, and preferably 10 to 30,000 mPa·s in a 2 mass % aqueous solution, more preferably 100 to 20,000 mPa·s in a 2 mass % aqueous solution, and still more preferably 200 to 15,000 mPa·s in a 2 mass % aqueous solution.

The mass ratio (A1)/(A2) between the component (A1) and the component (A2) is not particularly limited, and in order to obtain both adhesion preventing properties and low cost, the ratio is preferably in a range of 1 to 30, the lower limit value is more preferably 1.5 or more, 2 or more, or 3 or more, and the upper limit value is more preferably 25 or less, 20 or less, or 15 or less.

1-2. Component (B): Metallic Soap

In the adhesion preventing agent composition for unvulcanized rubber of the disclosure, as described above, the component (B) is a metallic soap. The metallic soap (B) is, for example, a salt other than sodium salts and potassium salts among metal salts of higher fatty acids or derivatives thereof, and is, for example, a salt other than alkali metal salts among these metal salts.

In the adhesion preventing agent composition for unvulcanized rubber of the disclosure, as described above, the component (B) includes both the following component (B1) and the following component (B2).
(B1) at least one metallic soap selected from the group consisting of calcium fatty acid and lithium fatty acid
(B2) at least one metallic soap selected from the group consisting of zinc fatty acid, magnesium fatty acid, and aluminum fatty acid The type of the component (B) (metallic soap (B)) is not particularly limited except that it includes both the component (B1) and the component (B2). For each of the component (B1) and the component (B2), one type may be used alone or a plurality of types may be used in combination. In addition, the component (B) (metallic soap (B)) may or may not include a component other than the component (B1) and the component (B2). As described above, the metallic soap (B) is, for example, a salt other than sodium salts and potassium salts among metal salts of higher fatty acids or derivatives thereof, and is, for example, a salt other than alkali metal salts among these metal salts. A higher fatty acid is, for example, a fatty acid having 8 or more carbon atoms, 10 or more, 12 or more, or 14 or more carbon atoms or 16 or more carbon atoms, and the upper limit value of the number of carbon atoms is not particularly limited, and for example, it is 24 or less, 22 or less, 20 or less, or 18 or less. A higher fatty acid derivative may be, for example, a higher fatty acid substituted with one or more substituents. Specific examples of the metallic soap (B) include, for example, calcium caprylate, lithium caprylate, zinc caprylate, magnesium caprylate, calcium caprylate, lithium caprylate, zinc caprylate, magnesium caprylate, calcium laurate, lithium laurate, zinc laurate, magnesium laurate, calcium myristate, lithium myristate, zinc myristate, magnesium myristate, calcium palmitate, lithium palmitate, zinc palmitate, magnesium palmitate, calcium stearate, lithium stearate, zinc stearate, magnesium stearate, aluminum stearate, aluminum trioctadecanoate, aluminum dioctadecanoate, aluminum monooctadecanoate, calcium octadecanoate, lithium octadecanoate, zinc octadecanoate, magnesium octadecanoate, calcium oleate, lithium oleate, zinc oleate, magnesium oleate, calcium behenate, lithium behenate, zinc behenate, magnesium behenate, calcium 12-hydroxystearate, lithium 12-hydroxystearate, zinc 12-hydroxystearate, magnesium 12-hydroxystearate, calcium 14-octadecanoate, lithium 14-octadecanoate, zinc 14-octadecanoate, magnesium 14-octadecanoate, calcium 8-octadecanoate, lithium 8-octadecanoate, zinc 8-octadecanoate, magnesium 8-octadecanoate, calcium 6-octadecanoate, lithium 6-octadecanoate, zinc 6-octadecanoate, magnesium 6-octadecanoate, coconut calcium fatty acid, coconut lithium fatty acid, coconut zinc fatty acid, coconut magnesium fatty acid, palm oil calcium fatty acid, palm oil lithium fatty acid, palm oil zinc fatty acid, palm oil magnesium fatty acid, palm kernel oil calcium fatty acid, palm kernel oil lithium fatty acid, palm kernel oil zinc fatty acid, palm kernel oil magnesium fatty acid, beef tallow calcium fatty acid, beef tallow lithium fatty acid, beef tallow zinc fatty acid, beef tallow magnesium fatty acid, castor oil calcium fatty acid, castor oil lithium fatty acid, castor oil zinc fatty acid, and castor oil magnesium fatty acid.

The metallic soap (B) is preferably a divalent metal salt of a fatty acid having an average carbon chain length of 12 to 22, and more preferably a divalent metal salt of a higher fatty acid having 14 to 20 or 16 to 18 carbon atoms. In addition, the metallic soap (B) is preferably a calcium salt, a magnesium salt, or a zinc salt. Among these, Ca stearate, Zn stearate, and Mg stearate are preferable because they are widely distributed and easily available at low cost.

The content (formulation amount) of the metallic soap (B) is not particularly limited, and is, for example, 1 to 25 mass %, 2 to 20 mass %, or 3 to 18 mass % with respect to a total mass of the adhesion preventing agent composition for unvulcanized rubber of the disclosure, and is, for example, 20 to 60 mass % with respect to a total mass of all components (solid content) other than water. If the mass of the metallic soap (B) is 20 mass % or more with respect to a total mass of all components other than water, this is preferable in consideration of lubricity of an adhesion preventing film, and if the mass of the metallic soap (B) is 60 mass % or less, this is preferable in consideration of powder dispersion minimization of the adhesion preventing agent composition for unvulcanized rubber and minimization of deterioration of handling properties due to a high viscosity. The content (formulation amount) of the metallic soap (B) with respect to a total mass of all components (solid content) other than water may be, for example, 25 mass % or more or 30 mass % or more, and may be, for example, 50 mass % or less, 45 mass % or less or 40 mass % or less.

In addition, the mass ratio (A)/(B) between the component (A) and the metallic soap (B) is not particularly limited, and for example, as described above, the mass ratio (A)/(B) may be in a range of 0.5 to 3. If the mass ratio (A)/(B) is 0.5 or more, it is easy to minimize powder dispersion of the adhesion preventing agent composition for unvulcanized rubber, and if the mass ratio (A)/(B) is 3 or less, it is easy to obtain an effect of improving adhesion preventing properties by mixing and dispersing the component (A) and the metallic soap (B). The lower limit value of the mass ratio (A)/(B) between the component (A) and the metallic soap (B) is more preferably 0.6 or more, 0.7 or more, or 0.8 or more, and the upper limit value thereof is more preferably 2.5 or less, 2.0 or less, or 1.5 or less.

In the adhesion preventing agent composition for unvulcanized rubber of the disclosure, the component (B1) functions, for example, as a lubricant, and has a function of improving dispersibility of the component (A) and improving adhesion preventing properties.

The component (B1) is not particularly limited, and for example, among metallic soaps exemplified as the component (B), a calcium fatty acid or lithium fatty acid metallic soap may be exemplified. As described above, regarding the component (B1), one type may be used alone or a plurality of types may be used in combination. Calcium stearate and lithium stearate are particularly preferable as the component (B1) because they are widely distributed and easily available at low prices and thus can contribute to cost reduction.

In the adhesion preventing agent composition for unvulcanized rubber of the disclosure, the content of the component (B1) is not particularly limited, and with respect to a total mass of the adhesion preventing agent composition for unvulcanized rubber, the content is, for example, 0.5 to 20 mass %, preferably, and the lower limit value is 0.8 mass % or more, 1 mass % or more, or 2 mass % or more, preferably, the upper limit value is 15 mass % or less, 12 mass % or less, or 10 mass % or less, and with respect to a total mass of 100 mass % of components (solid content) other than water, the content is, for example, 15 to 70 mass %, or 20 to 60 mass %, preferably, the lower limit value is 20 mass % or more, 25 mass % or more, or 30 mass % or more, and preferably, the upper limit value is 55 mass % or less, 52 mass % or less, or 50 mass % or less. In order to minimize or prevent insufficient lubricity of the adhesion preventing film, it is preferable that the content of the component (B1) be not too low, and particularly, the content is preferably 20 mass % or more with respect to a total mass 100 mass % of the solid content. In order to minimize or prevent powder dispersion and an increase in viscosity of a liquid product (the adhesion preventing agent composition for unvulcanized rubber or adhesion preventing agent composition aqueous dispersion for unvulcanized rubber) and prevent handling properties from deteriorating, it is preferable that the content of the component (B1) being not too large, and particularly, the content is preferably 60 mass % or less with respect to a total mass 100 mass % of the solid content.

In the adhesion preventing agent composition for unvulcanized rubber of the disclosure, the component (B2) functions, for example, as a lubricant, and has a function of minimizing thickening of the adhesion preventing agent composition for unvulcanized rubber or the adhesion preventing agent composition aqueous dispersion for unvulcanized rubber due to the component (B1).

The component (B2) is not particularly limited, and for example, among metallic soaps exemplified as the component (B), a zinc fatty acid, magnesium fatty acid, or aluminum fatty acid metallic soap may be exemplified. As described above, regarding the component (B2), one type may be used alone or a plurality of types may be used in combination. Zinc stearate and magnesium stearate are particularly preferable as the component (B2) because they are widely distributed and easily available at low prices and thus can contribute to cost reduction.

In the adhesion preventing agent composition for unvulcanized rubber of the disclosure, the content of the component (B2) is not particularly limited, and with respect to a total mass of the adhesion preventing agent composition for unvulcanized rubber, the content is, for example, 0.2 to 8 mass %, or 0.5 to 5 mass %, preferably, the lower limit value is 0.3 mass % or more, 0.5 mass % or more, or 0.8 mass % or more, preferably, the upper limit value is 7 mass % or less, 6 mass % or less, or 5 mass % or less, and with respect to a total mass of 100 mass % of components (solid content) other than water, the content is, for example, 2 to 30 mass %, 2 to 25 mass %, or 2.5 to 25 mass %, preferably, the lower limit value is 3 mass % or more, or 5 mass % or more, and preferably, the upper limit value is 25 mass % or less, 20 mass % or less, or 15 mass % or less. In order to minimize or prevent insufficient lubricity of the adhesion preventing film, it is preferable that the content of the component (B2) be not too low, and particularly, the content is preferably 2.5 mass % or more with respect to a total mass 100 mass % of the solid content. In order to minimize or prevent powder dispersion and an increase in viscosity of a liquid product (the adhesion preventing agent composition for unvulcanized rubber or adhesion preventing agent composition aqueous dispersion for unvulcanized rubber) and prevent handling properties from deteriorating, it is preferable that the content of the component (B2) being not too large, and particularly, the content is preferably 25 mass % or less with respect to a total mass 100 mass % of the solid content.

In addition, in the adhesion preventing agent composition for unvulcanized rubber of the disclosure, the mass ratio (B1)/(B2) between the component (B1) and the component (B2) (numerical value obtained by dividing the mass of the component (B1) by the mass of the component (B2)) is, as described above, in a range of 1 to 20, and preferably, the lower limit value is 1.5 or more, 2 or more, 2.5 or more, or 3 or more, and preferably, the upper limit value is 19 or less, 15 or less, 12 or less, or 10 or less. If the mass ratio (B1)/(B2) is less than 1, adhesion preventing properties tend to be insufficient and if the mass ratio (B1)/(B2) exceeds 20, a viscosity minimizing effect tends to be insufficient.

1-3. Component (C): Surfactant

In the adhesion preventing agent composition for unvulcanized rubber of the disclosure, the content of the component (C), that is, a surfactant (hereinafter referred to as a "surfactant (C)" in some cases), is not particularly limited, and is, for example, 0.5 to 12 mass %, 1 to 10 mass %, or 2 to 8 mass % with respect to a total mass of the adhesion preventing agent composition for unvulcanized rubber of the disclosure, and for example, 10 to 20 mass % with respect to a total mass of all components (solid content) other than water. When the content of the surfactant (C) with respect to a total mass of components other than water is 10 mass % or more, for example, the metallic soap (B) has an improved dispersion effect and becomes unlikely to separate, and when the content of the surfactant (C) is 20 mass % or less, for example, the dispersibility is appropriately reduced, the adhesion is improved, and adhesion preventing properties are also improved. The content of the surfactant (C) with respect to a total mass of components other than water may be, for example, 10 mass % or more or 12 mass % or more, and for example, 18 mass % or less or 16 mass % or less. Here, a method of measuring adhesion to unvulcanized rubber is not particularly limited, and it can be measured by, for example, a measurement method described in examples to be described below.

The surfactant (C) allows, for example, the adhesion preventing agent composition for unvulcanized rubber of the disclosure to disperse in water, to have better wettability, and to have better adhesion to unvulcanized rubber. The surfactant (C) is not particularly limited, and only one type may be used alone or a plurality of types may be used in combination, and for example, at least one of an anionic surfactant and a nonionic surfactant may be used. The anionic surfactant is not particularly limited, and examples thereof include the following (i) to (iv). In addition, the nonionic surfactant is not particularly limited, and examples thereof include the following (v).
(i) A carboxylic acid type anionic surfactant such as a higher fatty acid salt, an alkyl ether carboxylate, a polyoxyalkylene ether carboxylate, an alkyl (or alkenyl) amido ether carboxylate, and an acylaminocarboxylate
(ii) A sulfate ester type anionic surfactant such as a higher alcohol sulfate ester salt, a polyoxyalkylene higher alcohol sulfate ester salt, an alkylphenyl ether sulfate ester salt, a polyoxyalkylene alkylphenyl ether sulfate ester salt, and a glycerin fatty acid ester monosulfate ester salt
(iii) A sulfonic acid type anionic surfactant such as an alkanesulfonate, an α-olefin sulfonate, a linear alkyl benzene sulfonate, an α-sulfo fatty acid ester salt, and a dialkyl sulfosuccinate
(iv) A phosphate ester type anionic surfactant such as an alkyl phosphate ester salt, a polyoxyalkylene alkyl phosphate ester salt, a polyoxyalkylene alkyl phenyl phosphate ester salt, and a glycerin fatty acid ester monophosphate ester salt
(v) polyoxyalkylene alkyl ether type nonionic surfactant A counter ion of the anionic surfactant is not particularly limited, but ions of an alkali metal such as sodium and potassium and an alkanolamine such as monoethanolamine and diethanolamine are preferable. These may be used alone or a plurality of types thereof may be used in combination.

In order to obtain an adhesion preventing agent composition having excellent wettability with respect to a surface of unvulcanized rubber, the anionic surfactant is preferably a dialkyl sulfosuccinate and more preferably a dioctyl sulfosuccinate Na salt.

The nonionic surfactant is not particularly limited, and in the disclosure, for example, a nonionic surfactant represented by the following formula (1) can be used. The nonionic surfactant of the following formula (1), together with an anionic surfactant, is presumed to have an action of lowering a surface tension of an adhesion preventing agent composition with respect to a surface of unvulcanized rubber and effectively increasing adhesion of an adhesion preventing agent composition to a surface of unvulcanized rubber. However, this presumption does not limit the disclosure at all.

$$RO\text{-}(AO)_n\text{-}H \quad (1)$$

In Formula (1), R represents an aliphatic hydrocarbon group having 8 to 18 carbon atoms. The aliphatic hydrocarbon group may be linear or branched, and may be either saturated or unsaturated. The number of carbon atoms of R is preferably 12 to 16 and more preferably 12 to 13 in order to obtain excellent dispersibility of the component (A).

AO represents an oxyalkylene group having 2 to 4 carbon atoms, and n is an average number of moles of AO added.

n is, for example, 1 to 30, 1 to 25 or 2 to 15. Specifically, in order to prevent surface activity from decreasing and the dispersibility of the component (A) from decreasing, n is 1 or more (that is, it is not 0). In addition, in order to prevent decrease in adhesion due to too high hydrophilicity, n is 30 or less, 25 or less, or 20 or less. It is presumed that, when n is in a range of 1 to 30, in a range of 1 to 25, or in a range of 1 to 20, the dispersibility of the component (A) is further improved, and even if hydrophobicity of a surface of unvulcanized rubber is high, sufficient viscoelasticity is provided for dry coating of an adhesion preventing agent composition for unvulcanized rubber, and thus adhesion is improved. However, this presumption does not limit the disclosure at all.

The oxyalkylene group having 2 to 4 carbon atoms is, for example, a polymerization unit obtained by adding an alkylene oxide having 2 to 4 carbon atoms (formed by addition polymerization). Specific examples of the oxyalkylene group having 2 to 4 carbon atoms include an oxyethylene group (EO) to which ethylene oxide is added, an oxypropylene group (PO) to which propylene oxide is added, and an oxybutylene group (BO) to which butylene oxide is added. $(AO)_n$ has at least an oxyethylene group in its structure. When $(AO)_n$ includes a plurality of types of oxyethylene group (EO), oxypropylene group (PO), and oxybutylene group (BO), these groups may be arranged in a block form or arranged at random. A preferable $(AO)_n$ is composed of only oxyethylene groups (EO) in order to obtain excellent balance between hydrophilicity and hydrophobicity.

Specific examples of nonionic surfactants are not particularly limited, and examples thereof include lauryl ether EO, cetyl ether EO, stearyl ether EO, oleyl ether EO, decyl ether EO, isodecyl ether EO, tridecyl ether EO, secondary alcohol ether EO, synthetic alcohol ether EOPO, lauryl ether EOPO, decyl ether EOPO, isodecyl ether EOPO, tridecyl ether EOPO, and stearyl ether EOPO.

1-4. Water

In the adhesion preventing agent composition for unvulcanized rubber of the disclosure, the content of water is not particularly limited, and may be, for example, 50 mass % or more, 60 mass % or more or 70 mass % or more, and for example, 90 mass % or less, 85 mass % or less or 80 mass % or less with respect to a total mass of the adhesion preventing agent composition for unvulcanized rubber.

For example, water imparts fluidity to the adhesion preventing agent composition for unvulcanized rubber of the disclosure and makes it easier to handle. In addition, the water is not particularly limited, and may be, for example, tap water, distilled water, or deionized water.

1-5. Optional Components, Etc.

The adhesion preventing agent composition for unvulcanized rubber of the disclosure may or may not include optional components other than the components (A) to (C) and water.

For example, the adhesion preventing agent composition for unvulcanized rubber of the disclosure may contain additives such as an antifoaming agent, a preservative, a wettability auxiliary agent, a viscosity auxiliary agent, and a foreign matter reducing auxiliary agent, as necessary, as optional components.

The antifoaming agent is not particularly limited, and examples thereof include oil-based antifoaming agents such as a castor oil, sesame oil, linseed oil, and animal and vegetable oil; fatty acid ester-based antifoaming agents such as isoamyl stearate, distearyl succinate, ethylene glycol distearate, and butyl stearate; alcohol-based antifoaming agents such as polyoxyalkylene monohydric alcohol, di-t-amylphenoxyethanol, 3-heptanol, and 2-ethylhexanol; ether-based antifoaming agents such as di-t-aminophenoxyethanol, 3-heptyl cellosolve, nonyl cellosolve, and 3-heptyl carbitol; phosphate ester-based antifoaming agents such as tributyl phosphate and tris(butoxyethyl) phosphate; amine-based antifoaming agents such as diamylamine; amide-based antifoaming agents such as polyalkyleneamide and acylate polyamine; mineral oil; silicone oil; and the like. The antifoaming agents may be used alone or a plurality of types thereof may be used in combination.

The preservative is not particularly limited, and for example, isothiazolinone derivatives may be exemplified. The isothiazolinone derivatives are not particularly limited, and examples thereof include benzisothiazolinone (BIT), methylisothiazolinone (MIT, MI), chloromethylisothiazolinone (CMIT, CMI), octylisothiazolinone (OIT, OI), dichlorooctylisothiazolinone (DCOIT, DCOI) and their derivatives. The preservatives may be used alone or a plurality of types thereof may be used in combination.

The wettability auxiliary agent is not particularly limited, and for example, alcohols may be exemplified, and more specifically, for example, methanol, ethanol, hexanol, glycerin, 1,3-butanediol, propylene glycol, dipropylene glycol, pentylene glycol, hexylene glycol, polyethylene glycol, sorbitol, maltitol, sucrose, erythritol, xylitol, polyethylene glycol, polypropylene glycol, polyhydric alcohol ethylene oxides and propylene oxide adduct may be exemplified. The wettability auxiliary agents may be used alone or a plurality of types thereof may be used in combination.

The viscosity of the adhesion preventing agent composition for unvulcanized rubber of the disclosure is not particularly limited, and for example, because it is unlikely to separate and has good handling properties (handling), the viscosity measured 3 days after production of the adhesion preventing agent composition for unvulcanized rubber at 25° C. using a BH type viscometer at 20 rpm after 10 rotations is preferably 25,000 mPa·s or less, more preferably 1,000 to 25,000 mPa·s, still more preferably 2,000 to 25,000 mPa·s and particularly preferably 3,000 to 24,000 mPa·s, and preferably, the lower limit value is 4,000 mPa·s or more, 5,000 mPa·s or more, or 6,000 mPa·s or more, and preferably, the upper limit value is 20,000 mPa·s or less, 15,000 mPa·s or less, or 10,000 mPa·s or less. In order to minimize or prevent separation of the adhesion preventing agent composition for unvulcanized rubber, it is preferable that the viscosity of the adhesion preventing agent composition for unvulcanized rubber being not too low, and in order to minimize or prevent deterioration in handling, such as difficulty removing it from a container, it is preferable that the viscosity of the adhesion preventing agent composition for unvulcanized rubber being not too high.

2. Method of Producing Adhesion Preventing Agent Composition for Unvulcanized Rubber A method of producing an adhesion preventing agent composition for unvulcanized rubber of the disclosure is not particularly limited, and for example, all the components (the components (A) to (C) and water, and optional components added as necessary) of the adhesion preventing agent composition for unvulcanized rubber can be mixed for production. A mixing order, a device used for mixing, a facility and the like are not particularly limited. For example, a method in which water, a water-soluble polymer (the component (A)), and a surfactant (the component (C)) are mixed and the metallic soap (the component (B)) and other optional components are then mixed may be exemplified. As described above, the device used for mixing is not particularly limited, and for example, a device having a configuration having a stirring blade in a container can be used. Specifically, for example, liquid mixers such as general liquid mixers, vortex mixers, static mixers, homogenizers, and line homo mixers may be exemplified.

3. Method of Using Adhesion Preventing Agent Composition for Unvulcanized Rubber, Etc.

A method of using an adhesion preventing agent composition for unvulcanized rubber of the disclosure is not particularly limited, and for example, it may be the same as or similar to a general method of using an adhesion preventing agent composition for unvulcanized rubber. The method of using an adhesion preventing agent composition for unvulcanized rubber of the disclosure is specifically, for example, as follows, the method is not particularly limited thereto.

An adhesion preventing treatment method for unvulcanized rubber using an adhesion preventing agent composition for unvulcanized rubber of the disclosure may include, for example, as described above, an adhesion preventing treatment process in which an adhesion preventing treatment is performed by adhering the components (A) to (C) in the adhesion preventing agent composition for unvulcanized rubber of the disclosure to the surface of unvulcanized rubber. Adhesion to the surface of unvulcanized rubber can be performed by, for example, a wet method to be described below. Even if the unvulcanized rubber subjected to the adhesion preventing treatment (on which the adhesion preventing treatment is performed) in this manner is, for example, stored in a stacked or folded state, pieces of unvulcanized rubber do not adhere to each other. In addition, such an adhesion preventing treatment method for unvulcanized rubber can be, for example, a method of producing unvulcanized rubber subjected to an adhesion preventing treatment.

The adhesion preventing agent composition for unvulcanized rubber of the disclosure may be used without change, but it may be used in the form of a water-diluted solution (aqueous dispersion) in which the adhesion preventing agent composition is diluted in water. The concentration of the adhesion preventing agent composition for unvulcanized rubber of the disclosure adhered to the surface of unvulcanized rubber is not particularly limited, and with respect to a total mass of the adhesion preventing agent composition for unvulcanized rubber, a total mass of components other than water may be for example, 0.5 mass % or more, 1 mass % or more, or 2 mass % or more, and may be, for example, 15 mass % or less, 10 mass % or less, or 5 mass % or less. When the concentration is not too high, for example, an effect of low dispersibility and fast drying is obtained. When the concentration is not too low, for example, an effect of strong adhesion preventing properties and high lubricity is obtained. For example, even if the concentration of the adhesion preventing agent composition for unvulcanized rubber of the disclosure adhered to the surface of unvulcanized rubber is low, since strong adhesion preventing properties can be exhibited, strong adhesion preventing properties can be exhibited with a small adhesion amount. In addition, the viscosity during adhesion to the surface of unvulcanized rubber is not particularly limited, and may be, for example, 1 mPa·s or more, 5 mPa·s or more, or 10 mPa·s or more, and may be, for example, 30 mPa·s or less, 20 mPa·s or less, or 15 mPa·s or less. When the viscosity is not too high, for example, an effect of low dispersibility and fast drying is obtained. When the viscosity is not too low for example, an effect of strong adhesion preventing properties and high lubricity is obtained.

The adhesion preventing treatment process may be, for example, as described above, a process in which the adhesion preventing agent composition for unvulcanized rubber of the disclosure or the adhesion preventing agent composition aqueous dispersion for unvulcanized rubber of the disclosure is adhered to the surface of the unvulcanized rubber, and additionally water is volatilized, and thus the components (A) to (C) in the adhesion preventing agent composition for unvulcanized rubber of the disclosure are adhered to the surface of the unvulcanized rubber. More specifically, the adhesion preventing treatment process may include, for example, a process of adhering an adhesion preventing agent composition for unvulcanized rubber in which the adhesion preventing agent composition for unvulcanized rubber of the disclosure is adhered to the surface of unvulcanized rubber and a drying process in which the adhesion preventing agent composition for unvulcanized rubber on the surface of the unvulcanized rubber is dried and a coating is formed on the surface of unvulcanized rubber. Such an adhesion preventing treatment process is called, for example, a wet method. The wet method is not particularly limited, and, for example, it can be performed in the same manner as in a general adhesion preventing agent composition for unvulcanized rubber.

In the process of adhering an adhesion preventing agent composition for unvulcanized rubber, for example, the adhesion preventing agent composition for unvulcanized rubber is preferably adhered to unvulcanized rubber which is in a high temperature state (for example, about 80 to 150° C.) due to heat when it is molded into a sheet form or the like.

Examples of specific methods for the process of adhering an adhesion preventing agent composition for unvulcanized rubber include a method of spraying an adhesion preventing agent composition for unvulcanized rubber to unvulcanized rubber using a shower device and a dipping method in which unvulcanized rubber is immersed in a tank containing an adhesion preventing agent composition for unvulcanized rubber for a short time. In addition, a method of applying an adhesion preventing agent composition for unvulcanized rubber to unvulcanized rubber using a coating device may be used, and such methods may be appropriately used in combination.

According to the adhesion preventing agent composition for unvulcanized rubber of the disclosure, as described above, it is possible to reduce dust, it is possible for strong adhesion preventing properties to be exhibited with a small adhesion amount, and it is possible to obtain high lubricity. The type of rubber to which the adhesion preventing agent composition for unvulcanized rubber of the disclosure can be applied is not particularly limited, and any unvulcanized rubber may be used. Examples of types of rubber include rubber such as natural rubber (NR), butadiene rubber (BR), styrene butadiene rubber (SBR), butyl rubber (IIR), and EPDM (ethylene propylene rubber), and rubber in which a plurality of types thereof are mixed.

As described above, according to the adhesion preventing agent composition for unvulcanized rubber and the adhesion preventing agent composition aqueous dispersion for unvulcanized rubber of the disclosure, it is possible to obtain both lubricity and dispersibility in addition to excellent adhesion preventing properties. In addition, according to the adhesion preventing agent composition for unvulcanized rubber and the adhesion preventing agent composition aqueous dispersion for unvulcanized rubber of the disclosure, for example, the following effects are obtained. For example, cost can be reduced because organic particles are not used. In addition, for example, when the component (A1) and the component (A2) are used in combination, excellent adhesion preventing properties can be exhibited with respect to natural rubber (NR). In addition, for example, when the component (A1) and the component (A2) are used in combination, even if the metallic soap (B) is used in high-temperature rubber and the dispersibility is lowered, excellent adhesion preventing properties can be exhibited.

EXAMPLES

Next, examples of the disclosure will be described. However, the disclosure is not limited to the following examples.

Example 1

An adhesion preventing agent composition for unvulcanized rubber of Example 1 was produced as follows.

893 g of water was put into a reaction container and heated to 80° C. or higher. Then, 30 g of hydroxypropyl methylcellulose (product name "Metolose 60SH-4000," a methoxy group substitution degree of 1.9, a hydroxypropoxy group substitution mole number of 0.25, a 2% viscosity of 4,000 mPa·s, commercially available from Shin-Etsu Chemical Co., Ltd.) was put into the reaction container, and mixed for 2 hours. Here, the hydroxypropyl methylcellulose was a water-soluble polymer, and corresponded to the component (A) in the adhesion preventing agent composition for unvulcanized rubber of the disclosure. After a mixture obtained by performing mixing for 2 hours in this manner was cooled to 20° C. or lower, additionally, 50 g of calcium laurate (commercially available from Taihei Chemical Industrial Co., Ltd.), 10 g of zinc laurate (commercially available from Nitto Chemical Industry Co., Ltd.), 5 g of a coconut alcohol EO adduct (Leox (registered trademark) CC-150, commercially available from Lion Specialty Chemicals Co., Ltd.), 10 g of sodium α-olefin sulfonate (Riporan (registered trademark) LB-840, commercially available from Lion Specialty Chemicals Co., Ltd.), and 2 g of a preservative (product name "Topcide 609," commercially available from Permachem Asia Ltd.) were added and stirred to obtain a liquid adhesion preventing agent composition for unvulcanized rubber. Here, the calcium laurate was calcium fatty acid and corresponded to the component (B1) in the adhesion preventing agent composition for unvulcanized rubber of the disclosure. The zinc laurate was zinc fatty acid, and corresponded to the component (B2) in the adhesion preventing agent composition for unvulcanized rubber of the disclosure. The coconut alcohol EO adduct and the sodium α-olefin sulfonate were both a surfactant, and corresponded to the component (C) in the adhesion preventing agent composition for unvulcanized rubber of the disclosure. The preservative corresponded to an optional component other than the components (A) to (C).

Examples 2 to 44 and Comparative Examples 1 to 5

Adhesion preventing agent compositions for unvulcanized rubber of Examples 2 to 44 and Comparative Examples 1 to 5 were produced in the same manner as in Example 1 except that the types and compositions of raw materials were changed as shown in the following Tables 2 to 5. Here, the following Table 1 shows the product name (trade name), manufacturer and properties (composition) of raw materials used for producing the adhesion preventing agent compositions for unvulcanized rubber of Examples 1 to 44 and Comparative Examples 1 to 5.

TABLE 1

| | Raw material composition | Product name | Manufacturer | Composition |
|---|---|---|---|---|
| A | carboxymethylcellulose | CMC Daicel 1220 | Daicel Finechem Ltd. | an etherification degree of 0.8 to 1.0, and a 1% viscosity of 10 to 20 |
| | water-soluble acrylic polymer | Jurymer AC-10NPD | Toagosei Co., Ltd. | sodium polyacrylate, and a 40% viscosity of 100 to 300 |
| | polyvinyl alcohol | Kuraray Poval 95-88 | Kuraray Co., Ltd. | partial saponification, a saponification degree of 87.0 to 89.0, and a 4% viscosity of 80.0 to 110.0 |
| | PVA | J Poval JP-24 | Japan Vam & Poval Co., Ltd. | partial saponification, a saponification degree of 87.0 to 89.0, and a 4% viscosity of 40.0 to 50.0 |
| | hydroxypropyl methylcellulose | Metolose 60SH-4000 | Shin-Etsu Chemical Co., Ltd. | a methoxy group substitution degree of 1.9, a hydroxypropoxy group substitution mole number of 0.25, a 2% viscosity of 4,000 |
| | hydroxyethyl cellulose | HEC Daicel SP900 | Daicel Finechem Ltd. | a 1% viscosity of 4,000 to 5,500 |
| | hydroxyethyl methylcellulose | Metolose SEB-4000 | Shin-Etsu Chemical Co., Ltd. | a methoxy group substitution degree of 1.5, a hydroxypropoxy group substitution mole number of 0.20, and a 2% viscosity of 4,000 |
| | methyl cellulose | Metolose SM-4000 | Shin-Etsu Chemical Co., Ltd. | a methoxy group substitution degree of 1.8 and a 2% viscosity of 4,000 |
| | MC | Metolose SM-100 | Shin-Etsu Chemical Co., Ltd. | a methoxy group substitution degree of 1.8 and a 2% viscosity of 100 |
| B1 | laurate Ca | CS-3 | Nitto Chemical Industry Co., Ltd. | |
| | stearate Ca | calcium stearate | Taihei Chemical Industrial Co., Ltd. | |
| | oleate Ca | calcium oleate | Kanto Chemical Co., Inc. | |
| | behenate Ca | CS-7 | Nitto Chemical Industry Co., Ltd. | |
| | laurate Li | LS-3 | Nitto Chemical Industry Co., Ltd. | |
| | stearate Li | LI-ST | Nitto Chemical Industry Co., Ltd. | |
| | oleate Li | lithium oleate | Mitsuwa Chemicals Co., Ltd. | |
| | behenate Li | LS-7 | Nitto Chemical Industry Co., Ltd. | |
| B2 | laurate Zn | ZS-3 | Nitto Chemical Industry Co., Ltd. | |
| | stearate Zn | Zn-St | Nitto Chemical Industry Co., Ltd. | |
| | oleate Zn | zinc(II) oleate | Mitsuwa Chemicals Co., Ltd. | |
| | behenate Zn | ZS-7 | Nitto Chemical Industry Co., Ltd. | |
| | laurate Mg | magnesium mystate | Taihei Chemical Industrial Co., Ltd. | |
| | stearate Mg | Mg-St | Nitto Chemical Industry Co., Ltd. | |
| | oleate Mg | magnesium oleate | Kanto Chemical Co., Inc. | |

TABLE 1-continued

| Raw material composition | | Product name | Manufacturer | Composition |
|---|---|---|---|---|
| | behenate Mg | MS-7 | Nitto Chemical Industry Co., Ltd. | |
| | laurate Al | aluminum laurate | Kanto Chemical Co., Inc. | |
| | stearate Al | Al-St(102) | Nitto Chemical Industry Co., Ltd. | |
| | oleate Al | aluminum oleate | Kanto Chemical Co., Inc. | |
| | montanate Al | AS-8 | Nitto Chemical Industry Co., Ltd. | |
| C | coconut alcohol EO adduct | Leox ®CC-150 | Lion Specialty Chemicals Co., Ltd. | coconut alcohol-EO 15-mole adduct |
| | sodium α-olefin sulfonate Na | Riporan ®LB-840 | Lion Specialty Chemicals Co., Ltd. | sodium α-olefin sulfonate |
| | preservative | Topcide609 | Permachem Asia Ltd. | BIT preservative |

[Production and Performance Evaluation of Adhesion Preventing Agent Composition Aqueous Dispersion for Unvulcanized Rubber]

The adhesion preventing agent compositions for unvulcanized rubber of the examples and comparative examples were diluted 20-fold (mass ratio) with water to produce adhesion preventing agent composition aqueous dispersions for unvulcanized rubber (adhesion preventing agent suspension). An adhesion preventing treatment was performed on unvulcanized rubber using the adhesion preventing agent composition aqueous dispersion for unvulcanized rubber, and performance of adhesion preventing properties, lubricity, dispersibility and removability of deposits on facilities was evaluated. The adhesion preventing treatment method and methods of evaluating the above performance are shown below.

(1) Rubber for Evaluation

Evaluation

For various evaluations, the following unvulcanized SBR rubber and unvulcanized NR rubber were used as evaluation rubbers.

Unvulcanized SBR Rubber

Unvulcanized SBR rubber (a total of 151.5 parts by mass) in which 30 parts by mass of SAF carbon (commercially available from Mitsubishi Chemical Corporation, product name "Diablack A"), 15 parts by mass of JSRAROMA (process oil) (commercially available from Japan Sun Oil Co., Ltd., product name "Aroma 790"), 3 parts by mass of zinc oxide (commercially available from Hakusui Tech, two types of zinc oxide), 1 part by mass of stearic acid (camellia, commercially available from NOF Corporation), 1 part by mass of 6PPD (commercially available from Ouchi Shinko Chemical Industrial Co., Ltd., product name "Nocrac 6C"), 1 part by mass of CBS (commercially available from Ouchi Shinko Chemical Industrial Co., Ltd., product name "NOCCELER CZ-G"), and 1.5 parts by mass of sulfur (commercially available from Tsurumi Chemical Industry Co., Ltd.) were mixed with respect to 100 parts by mass of SBR (commercially available from Asahi Kasei Corporation, product name "TUFDENE 4850") was used.

Unvulcanized NR Rubber

Unvulcanized NR rubber (a total of 162.5 parts by mass) in which 10 parts by mass of white carbon (commercially available from Tosoh Silica Corporation, product name "Nipsil VN-3"), 30 parts by mass of ISAF (Intermediate Super Abrasion Furnace) black (commercially available from Tokai Carbon Co., Ltd., product name "Seast 6"), 15 parts by mass of JSRAROMA (process oil) (commercially available from Japan Sun Oil Co., Ltd., product name "Aroma 790"), 3 parts by mass of zinc oxide (two types of zinc oxide, commercially available from Hakusui Tech), 1 part by mass of stearic acid (camellia, commercially available from NOF Corporation), 1 part by mass of 6PPD (commercially available from Ouchi Shinko Chemical Industrial Co., Ltd., product name "Nocrac 6C"), 1 part by mass of CBS (commercially available from Ouchi Shinko Chemical Industrial Co., Ltd., product name "NOCCELER CZ-G"), and 1.5 parts by mass of sulfur (commercially available from Tsurumi Chemical Industry Co., Ltd.) were mixed with respect to 100 parts by mass of NR(RSS #3) was used.

(2) Evaluation of Adhesion Preventing Properties

The unvulcanized rubber was kneaded with an open roll at a temperature of 80 to 120° C. to form a rubber sheet (thickness: 5 to 8 mm, 60 cm×15 cm), and the rubber sheet immediately after being unwound was immersed in 1 L of an adhesion preventing agent composition aqueous dispersion for unvulcanized rubber (adhesion preventing agent suspension, a temperature of 40° C.) obtained by diluting the adhesion preventing agent composition for unvulcanized rubber obtained in each of Examples 1 to 44 and Comparative Examples 1 to 5 20-fold with water for about 1 second. Then, the rubber sheet was quickly lifted vertically, left in a vertical state at room temperature, and dried naturally. In this manner, the rubber sheet (unvulcanized rubber) was subjected to an adhesion preventing treatment.

The rubber sheet after the adhesion preventing treatment was cut to 6 cm×15 cm, two sheets were superimposed to form a laminated test piece, a load of 1 t/m² was applied in a vertical direction from one surface with respect to the laminated test piece, and the test piece was left at 60° C. for 12 hours.

After that, the temperature of the test piece was returned to room temperature, a 180° peel test was performed using a tensile testing machine [AGS-500D type, SHIMADZU], and the peel resistance (N/cm) was measured at a tensile speed of 300 mm/min. A smaller peel resistance (N/cm) indicates better adhesion preventing properties.

(3) Evaluation of Lubricity

An adhesion preventing treatment was performed on rubber sheet (unvulcanized rubber) in the same method as in the above (2) evaluation of adhesion preventing properties. Next, the dried unvulcanized rubber sheet after the adhesion preventing treatment was cut into a rectangle of 5×15 cm. This rubber was placed on a stainless steel plate, this plate was gradually inclined, and an inclination angle when it slid down was measured. A lower sliding down angle indicates excellent lubricity.

(4) Evaluation of Dispersibility

An adhesion preventing treatment was performed on rubber sheet (unvulcanized rubber) in the same method as in the above (2) evaluation of adhesion preventing properties. Next, the dried unvulcanized rubber sheet after the adhesion preventing treatment was cut into a rectangle of 6×15 cm, and the weight was measured. Front and back surfaces of the rubber were swept with a brush 10 times, and the weight thereof was then measured again, and an amount of scattering was calculated. A smaller amount of scattering indicates excellent dispersibility.

(5) Evaluation of Viscosity

The viscosity of the adhesion preventing agent composition for unvulcanized rubber before it was diluted 20-fold (mass ratio) with water was measured 3 days after production. For viscosity measurement, the viscosity was measured after 10 rotations at 25° C. and 20 rpm using a BH type viscometer (product name "BII type viscometer," commercially available from Tokimec Co., Ltd.).

The following Tables 2 to 5 show the types and compositions of raw materials in the adhesion preventing agent compositions for unvulcanized rubber of Examples 1 to 44 and Comparative Examples 1 to 5, and evaluation results of performance of adhesion preventing properties, lubricity, dispersibility and viscosity evaluated as described above together. In the following Tables 2 to 5, the numerical value indicating the amount of each raw material (including water) used is the content (mass %) with respect to a total mass (including water) of the adhesion preventing agent composition for unvulcanized rubber. In addition, "A ratio," "B ratio" and "C ratio" are numerical values indicating the contents (mass %) of the component (A), the component (B) and the component (C), respectively, with respect to 100 mass % of all components other than water in the adhesion preventing agent composition for unvulcanized rubber. "A/B" is the ratio of the mass of the component (A) divided by the mass of the component (B). "B1/B2" is the ratio of the mass of the component (B1) divided by the mass of the component (B2).

TABLE 2

| Stratification | Raw material | Example 1 | Example 2 | Example 3 | Example 4 | Example 5 | Example 6 | Example 7 |
|---|---|---|---|---|---|---|---|---|
| A | carboxymethylcellulose | | | | | | | |
| | water-soluble acrylic polymer | | | | | | | |
| | polyvinyl alcohol | | | | | | | |
| A(A2) | hydroxypropyl methylcellulose | 3 | 3 | 3 | 3 | 3 | 3 | 3 |
| | hydroxyethyl cellulose | | | | | | | |
| | hydroxyethyl methylcellulose | | | | | | | |
| | methyl cellulose | | | | | | | |
| B1 | laurate Ca | 5 | 5 | 5 | 5 | 5 | 5 | 5 |
| | stearate Ca | | | | | | | |
| | oleate Ca | | | | | | | |
| | behenate Ca | | | | | | | |
| | laurate Li | | | | | | | |
| | stearate Li | | | | | | | |
| | oleate Li | | | | | | | |
| | behenate Li | | | | | | | |
| B2 | laurate Zn | 1 | | | | | | |
| | stearate Zn | | 1 | | | | | |
| | oleate Zn | | | 1 | | | | |
| | behenate Zn | | | | 1 | | | |
| | laurate Mg | | | | | 1 | | |
| | stearate Mg | | | | | | 1 | |
| | oleate Mg | | | | | | | 1 |
| | behenate Mg | | | | | | | |
| | laurate Al | | | | | | | |
| | stearate Al | | | | | | | |
| | oleate Al | | | | | | | |
| | montanate Al | | | | | | | |
| C | coconut alcohol EO adduct | 0.5 | 0.5 | 0.5 | 0.5 | 0.5 | 0.5 | 0.5 |
| | sodium α-olefin sulfonate Na | 1 | 1 | 1 | 1 | 1 | 1 | 1 |
| | preservative | 0.2 | 0.2 | 0.2 | 0.2 | 0.2 | 0.2 | 0.2 |
| | water | 89.3 | 89.3 | 89.3 | 89.3 | 89.3 | 89.3 | 89.3 |
| | A ratio | 28.6 | 28.6 | 28.6 | 28.6 | 28.6 | 28.6 | 28.6 |
| | B ratio | 57.1 | 57.1 | 57.1 | 57.1 | 57.1 | 57.1 | 57.1 |
| | C ratio | 14.3 | 14.3 | 14.3 | 14.3 | 14.3 | 14.3 | 14.3 |
| | A/B | 0.5 | 0.5 | 0.5 | 0.5 | 0.5 | 0.5 | 0.5 |
| | B1/B2 | 5.0 | 5.0 | 5.0 | 5.0 | 5.0 | 5.0 | 5.0 |
| | adhesion preventing properties 1 (N/cm) SBR | 0.2 | 0.2 | 0.2 | 0.2 | 0.2 | 0.2 | 0.2 |
| | lubricity (degree) | 30-35 | 30-35 | 30-35 | 30-35 | 30-35 | 30-35 | 30-35 |
| | viscosity (mPa · s) | 12000 | 12500 | 12500 | 13000 | 12000 | 12500 | 12500 |
| | dispersibility (mg/100 cm$^2$) | 0.1 | 0.1 | 0.1 | 0.1 | 0.1 | 0.1 | 0.1 |

TABLE 2-continued

| Stratification | Raw material | Example 8 | Example 9 | Example 10 | Example 11 | Example 12 |
|---|---|---|---|---|---|---|
| A | carboxymethylcellulose | | | | | |
|  | water-soluble acrylic polymer | | | | | |
|  | polyvinyl alcohol | | | | | |
| A(A2) | hydroxypropyl methylcellulose | 3 | 3 | 3 | 3 | 3 |
|  | hydroxyethyl cellulose | | | | | |
|  | hydroxyethyl methylcellulose | | | | | |
|  | methyl cellulose | | | | | |
| B1 | laurate Ca | 5 | 5 | 5 | 5 | 5 |
|  | stearate Ca | | | | | |
|  | oleate Ca | | | | | |
|  | behenate Ca | | | | | |
|  | laurate Li | | | | | |
|  | stearate Li | | | | | |
|  | oleate Li | | | | | |
|  | behenate Li | | | | | |
| B2 | laurate Zn | | | | | |
|  | stearate Zn | | | | | |
|  | oleate Zn | | | | | |
|  | behenate Zn | | | | | |
|  | laurate Mg | | | | | |
|  | stearate Mg | | | | | |
|  | oleate Mg | | | | | |
|  | behenate Mg | 1 | | | | |
|  | laurate Al | | 1 | | | |
|  | stearate Al | | | 1 | | |
|  | oleate Al | | | | 1 | |
|  | montanate Al | | | | | 1 |
| C | coconut alcohol EO adduct | 0.5 | 0.5 | 0.5 | 0.5 | 0.5 |
|  | sodium α-olefin sulfonate Na | 1 | 1 | 1 | 1 | 1 |
|  | preservative | 0.2 | 0.2 | 0.2 | 0.2 | 0.2 |
|  | water | 89.3 | 89.3 | 89.3 | 89.3 | 89.3 |
|  | A ratio | 28.6 | 28.6 | 28.6 | 28.6 | 28.6 |
|  | B ratio | 57.1 | 57.1 | 57.1 | 57.1 | 57.1 |
|  | C ratio | 14.3 | 14.3 | 14.3 | 14.3 | 14.3 |
|  | A/B | 0.5 | 0.5 | 0.5 | 0.5 | 0.5 |
|  | B1/B2 | 5.0 | 5.0 | 5.0 | 5.0 | 5.0 |
|  | adhesion preventing properties 1 (N/cm) SBR | 0.2 | 0.2 | 0.2 | 0.2 | 0.2 |
|  | lubricity (degree) | 30-35 | 30-35 | 30-35 | 30-35 | 30-35 |
|  | viscosity (mPa · s) | 13000 | 13000 | 13500 | 13500 | 14000 |
|  | dispersibility (mg/100 cm$^2$) | 0.1 | 0.1 | 0.1 | 0.1 | 0.1 |

TABLE 3

| Stratification | Raw material | Example 13 | Example 14 | Example 15 | Example 16 | Example 17 | Example 18 |
|---|---|---|---|---|---|---|---|
| A | carboxymethylcellulose | | | | | | |
|  | water-soluble acrylic polymer | | | | | | |
|  | polyvinyl alcohol | | | | | | |
| A(A2) | hydroxypropyl methylcellulose | 3 | 3 | 3 | 3 | 3 | 3 |
|  | hydroxyethyl cellulose | | | | | | |
|  | hydroxyethyl methylcellulose | | | | | | |
|  | methyl cellulose | | | | | | |
| B1 | laurate Ca | | | | | | |
|  | stearate Ca | 5 | | | | | |
|  | oleate Ca | | 5 | | | | |
|  | behenate Ca | | | 5 | | | |
|  | laurate Li | | | | 5 | | |
|  | stearate Li | | | | | 5 | |
|  | oleate Li | | | | | | 5 |
|  | behenate Li | | | | | | |
| B2 | laurate Zn | 1 | 1 | 1 | 1 | 1 | 1 |
|  | stearate Zn | | | | | | |
|  | oleate Zn | | | | | | |
|  | behenate Zn | | | | | | |
|  | laurate Mg | | | | | | |
|  | stearate Mg | | | | | | |
|  | oleate Mg | | | | | | |
|  | behenate Mg | | | | | | |
|  | laurate Al | | | | | | |
|  | stearate Al | | | | | | |
|  | oleate Al | | | | | | |
|  | montanate Al | | | | | | |
| C | coconut alcohol EO adduct | 0.5 | 0.5 | 0.5 | 0.5 | 0.5 | 0.5 |
|  | sodium α-olefin sulfonate Na | 1 | 1 | 1 | 1 | 1 | 1 |

TABLE 3-continued

| | | | | | | | |
|---|---|---|---|---|---|---|---|
| | preservative | 0.2 | 0.2 | 0.2 | 0.2 | 0.2 | 0.2 |
| | water | 89.3 | 89.3 | 89.3 | 89.3 | 89.3 | 89.3 |
| | A ratio | 28.6 | 28.6 | 28.6 | 28.6 | 28.6 | 28.6 |
| | B ratio | 57.1 | 57.1 | 57.1 | 57.1 | 57.1 | 57.1 |
| | C ratio | 14.3 | 14.3 | 14.3 | 14.3 | 14.3 | 14.3 |
| | A/B | 0.5 | 0.5 | 0.5 | 0.5 | 0.5 | 0.5 |
| | B1/B2 | 5.0 | 5.0 | 5.0 | 5.0 | 5.0 | 5.0 |
| | adhesion preventing properties 1 (N/cm) SBR | 0.2 | 0.2 | 0.2 | 0.2 | 0.2 | 0.2 |
| | lubricity (degree) | 30-35 | 30-35 | 30-35 | 30-35 | 30-35 | 30-35 |
| | viscosity (mPa · s) | 13000 | 13500 | 13500 | 14000 | 13000 | 13000 |
| | dispersibility (mg/100 cm$^2$) | 0.1 | 0.1 | 0.1 | 0.1 | 0.1 | 0.1 |

| Stratification | Raw material | Example 19 | Example 20 | Example 21 | Example 22 | Example 23 | Example 24 |
|---|---|---|---|---|---|---|---|
| A | carboxymethylcellulose | | 3 | | | | |
| | water-soluble acrylic polymer | | | 3 | | | |
| | polyvinyl alcohol | | | | 3 | | |
| A(A2) | hydroxypropyl methylcellulose | 3 | | | | | |
| | hydroxyethyl cellulose | | | | | 3 | |
| | hydroxyethyl methylcellulose | | | | | | 3 |
| | methyl cellulose | | | | | | |
| B1 | laurate Ca | | 5 | 5 | 5 | 5 | 5 |
| | stearate Ca | | | | | | |
| | oleate Ca | | | | | | |
| | behenate Ca | | | | | | |
| | laurate Li | | | | | | |
| | stearate Li | | | | | | |
| | oleate Li | | | | | | |
| | behenate Li | 5 | | | | | |
| B2 | laurate Zn | 1 | 1 | 1 | 1 | 1 | 1 |
| | stearate Zn | | | | | | |
| | oleate Zn | | | | | | |
| | behenate Zn | | | | | | |
| | laurate Mg | | | | | | |
| | stearate Mg | | | | | | |
| | oleate Mg | | | | | | |
| | behenate Mg | | | | | | |
| | laurate Al | | | | | | |
| | stearate Al | | | | | | |
| | oleate Al | | | | | | |
| | montanate Al | | | | | | |
| C | coconut alcohol EO adduct | 0.5 | 0.5 | 0.5 | 0.5 | 0.5 | 0.5 |
| | sodium α-olefin sulfonate Na | 1 | 1 | 1 | 1 | 1 | 1 |
| | preservative | 0.2 | 0.2 | 0.2 | 0.2 | 0.2 | 0.2 |
| | water | 89.3 | 89.3 | 89.3 | 89.3 | 89.3 | 89.3 |
| | A ratio | 28.6 | 28.6 | 28.6 | 28.6 | 28.6 | 28.6 |
| | B ratio | 57.1 | 57.1 | 57.1 | 57.1 | 57.1 | 57.1 |
| | C ratio | 14.3 | 14.3 | 14.3 | 14.3 | 14.3 | 14.3 |
| | A/B | 0.5 | 0.5 | 0.5 | 0.5 | 0.5 | 0.5 |
| | B1/B2 | 5.0 | 5.0 | 5.0 | 5.0 | 5.0 | 5.0 |
| | adhesion preventing properties 1 (N/cm) SBR | 0.2 | 0.4 | 0.4 | 0.4 | 0.2 | 0.2 |
| | lubricity (degree) | 30-35 | 30-35 | 30-35 | 30-35 | 30-35 | 30-35 |
| | viscosity (mPa · s) | 15000 | 7000 | 7000 | 9000 | 12000 | 12000 |
| | dispersibility (mg/100 cm$^2$) | 0.1 | 0.1 | 0.1 | 0.1 | 0.1 | 0.1 |

TABLE 4

| Stratification | Raw material | Example 25 | Example 26 | Example 27 | Example 28 | Example 29 | Example 30 |
|---|---|---|---|---|---|---|---|
| A | carboxymethylcellulose | | | | | | |
| | water-soluble acrylic polymer | | | | | | |
| | polyvinyl alcohol | | | | | | |
| A(A2) | hydroxypropyl methylcellulose | | 2.8 | 3 | 3 | 3 | 5 |
| | hydroxyethyl cellulose | | | | | | |
| | hydroxyethyl methylcellulose | | | | | | |
| | methyl cellulose | 3 | | | | | |
| B1 | laurate Ca | 5 | 5 | 0.8 | 4 | 5 | 5 |
| | stearate Ca | | | | | | |
| | oleate Ca | | | | | | |
| | behenate Ca | | | | | | |
| | laurate Li | | | | | | |
| | stearate Li | | | | | | |
| | oleate Li | | | | | | |
| | behenate Li | | | | | | |

TABLE 4-continued

| Stratification | Raw material | | | | | | |
|---|---|---|---|---|---|---|---|
| B2 | laurate Zn | 1 | 1 | 0.4 | 0.8 | 1 | 0.25 |
| | stearate Zn | | | | | | |
| | oleate Zn | | | | | | |
| | behenate Zn | | | | | | |
| | laurate Mg | | | | | | |
| | stearate Mg | | | | | | |
| | oleate Mg | | | | | | |
| | behenate Mg | | | | | | |
| | laurate Al | | | | | | |
| | stearate Al | | | | | | |
| | oleate Al | | | | | | |
| | montanate Al | | | | | | |
| C | coconut alcohol EO adduct | 0.5 | 0.5 | 0.3 | 0.3 | 0.75 | 0.5 |
| | sodium α-olefin sulfonate Na | 1 | 1 | 0.6 | 0.6 | 1.5 | 1 |
| | preservative | 0.2 | 0.2 | 0.2 | 0.2 | 0.2 | 0.2 |
| | water | 89.3 | 89.5 | 94.7 | 91.1 | 88.55 | 88.05 |
| | A ratio | 28.6 | 27.2 | 58.8 | 34.5 | 26.7 | 42.6 |
| | B ratio | 57.1 | 58.3 | 23.5 | 55.2 | 53.3 | 44.7 |
| | C ratio | 14.3 | 14.6 | 17.6 | 10.3 | 20.0 | 12.8 |
| | A/B | 0.5 | 0.5 | 2.5 | 0.6 | 0.5 | 1.0 |
| | B1/B2 | 5.0 | 5.0 | 2.0 | 5.0 | 5.0 | 20.0 |
| | adhesion preventing properties 1 (N/cm) SBR | 0.2 | 0.3 | 0.2 | 0.2 | 0.2 | 0.2 |
| | lubricity (degree) | 30-35 | 30-35 | 50 | 30-35 | 30-35 | 30-35 |
| | viscosity (mPa · s) | 12000 | 11000 | 12000 | 15000 | 7000 | 18000 |
| | dispersibility (mg/100 cm$^2$) | 0.1 | 0.1 | 0.1 | 0.1 | 0.1 | 0.1 |

| Stratification | Raw material | Example 31 | Example 32 | Example 33 | Example 34 | Example 35 | Example 36 |
|---|---|---|---|---|---|---|---|
| A | carboxymethylcellulose | | | | | | 3 |
| | water-soluble acrylic polymer | | | | | | |
| | polyvinyl alcohol | | 3 | 3 | 3 | 3 | |
| A(A2) | hydroxypropyl methylcellulose | 3 | 1 | | | | 1 |
| | hydroxyethyl cellulose | | | 1 | | | |
| | hydroxyethyl methylcellulose | | | | 1 | | |
| | methyl cellulose | | | | | 1 | |
| B1 | laurate Ca | 3 | 5 | 5 | 5 | 5 | 5 |
| | stearate Ca | | | | | | |
| | oleate Ca | | | | | | |
| | behenate Ca | | | | | | |
| | laurate Li | | | | | | |
| | stearate Li | | | | | | |
| | oleate Li | | | | | | |
| | behenate Li | | | | | | |
| B2 | laurate Zn | 3 | 1 | 1 | 1 | 1 | 1 |
| | stearate Zn | | | | | | |
| | oleate Zn | | | | | | |
| | behenate Zn | | | | | | |
| | laurate Mg | | | | | | |
| | stearate Mg | | | | | | |
| | oleate Mg | | | | | | |
| | behenate Mg | | | | | | |
| | laurate Al | | | | | | |
| | stearate Al | | | | | | |
| | oleate Al | | | | | | |
| | montanate Al | | | | | | |
| C | coconut alcohol EO adduct | 0.5 | 0.5 | 0.5 | 0.5 | 0.5 | 0.5 |
| | sodium α-olefin sulfonate Na | 1 | 1 | 1 | 1 | 1 | 1 |
| | preservative | 0.2 | 0.2 | 0.2 | 0.2 | 0.2 | 0.2 |
| | water | 89.3 | 88.3 | 88.3 | 88.3 | 88.3 | 88.3 |
| | A ratio | 28.6 | 34.8 | 34.8 | 34.8 | 34.8 | 34.8 |
| | B ratio | 57.1 | 52.2 | 52.2 | 52.2 | 52.2 | 52.2 |
| | C ratio | 14.3 | 13.0 | 13.0 | 13.0 | 13.0 | 13.0 |
| | A/B | 0.5 | 0.7 | 0.7 | 0.7 | 0.7 | 0.7 |
| | B1/B2 | 1.0 | 5.0 | 5.0 | 5.0 | 5.0 | 5.0 |
| | adhesion preventing properties 1 (N/cm) SBR | 0.2 | 0.2 | 0.2 | 0.2 | 0.2 | 0.3 |
| | lubricity (degree) | 30-35 | 30-35 | 30-35 | 30-35 | 30-35 | 30-35 |
| | viscosity (mPa · s) | 6000 | 9000 | 9000 | 9000 | 9000 | 6000 |
| | dispersibility (mg/100 cm$^2$) | 0.1 | 0.1 | 0.1 | 0.1 | 0.1 | 0.1 |

TABLE 5

| Stratification | Raw material | Example 37 | Example 38 | Example 39 | Example 40 | Example 41 | Example 42 | Example 43 |
|---|---|---|---|---|---|---|---|---|
| A | carboxymethylcellulose | 3 | 3 | 3 | | | | |
|  | water-soluble acrylic polymer | | | | 3 | | | |
|  | polyvinyl alcohol | | | | | 3 | 3 | 5 |
| A(A2) | hydroxypropyl methyl cellulose | | | | 1 | 1 | 1 | 0.25 |
|  | hydroxyethyl cellulose | 1 | | | | | | |
|  | hydroxyethyl methylcellulose | | 1 | | | | | |
|  | methyl cellulose | | | 1 | | | | |
| B1 | laurate Ca | 5 | 5 | 5 | 5 | 3 | 5.7 | 5 |
|  | stearate Ca | | | | | | | |
|  | oleate Ca | | | | | | | |
|  | behenate Ca | | | | | | | |
|  | laurate Li | | | | | | | |
|  | stearate Li | | | | | | | |
|  | oleate Li | | | | | | | |
|  | behenate Li | | | | | | | |
| B2 | laurate Zn | 1 | 1 | 1 | 1 | 2 | 0.3 | 1 |
|  | stearate Zn | | | | | | | |
|  | oleate Zn | | | | | | | |
|  | behenate Zn | | | | | | | |
|  | laurate Mg | | | | | | | |
|  | stearate Mg | | | | | | | |
|  | oleate Mg | | | | | | | |
|  | behenate Mg | | | | | | | |
|  | laurate Al | | | | | | | |
|  | stearate Al | | | | | | | |
|  | oleate Al | | | | | | | |
|  | montanate Al | | | | | | | |
| C | coconut alcohol EO adduct | 0.5 | 0.5 | 0.5 | 0.5 | 0.5 | 0.5 | 0.5 |
|  | sodium α-olefin sulfonate Na | 1 | 1 | 1 | 1 | 1 | 1 | 1 |
|  | preservative | 0.2 | 0.2 | 0.2 | 0.2 | 0.2 | 0.2 | 0.2 |
|  | water | 88.3 | 88.3 | 88.3 | 88.3 | 89.3 | 88.3 | 87.05 |
|  | A ratio | 34.8 | 34.8 | 34.8 | 34.8 | 38.1 | 34.8 | 41.2 |
|  | B ratio | 52.2 | 52.2 | 52.2 | 52.2 | 47.6 | 52.2 | 47.1 |
|  | C ratio | 13.0 | 13.0 | 13.0 | 13.0 | 14.3 | 13.0 | 11.8 |
|  | A/B | 0.7 | 0.7 | 0.7 | 0.7 | 0.8 | 0.7 | 0.9 |
|  | B1/B2 | 5.0 | 5.0 | 5.0 | 5.0 | 1.5 | 19.0 | 5.0 |
|  | adhesion preventing properties 1 (N/cm) SBR | 0.3 | 0.3 | 0.3 | 0.5 | 0.5 | 0.5 | 0.2 |
|  | lubricity (degree) | 30-35 | 30-35 | 30-35 | 30-35 | 30-35 | 30-35 | 30-35 |
|  | viscosity (mPa · s) | 6000 | 6000 | 6000 | 5000 | 4000 | 6000 | 9000 |
|  | dispersibility (mg/100 cm$^2$) | 0.1 | 0.1 | 0.1 | 0.1 | 0.1 | 0.1 | 0.1 |

| Stratification | Raw material | Example 44 | Comparative Example 1 | Comparative Example 2 | Comparative Example 3 | Comparative Example 4 | Comparative Example 5 |
|---|---|---|---|---|---|---|---|
| A | carboxymethylcellulose | | | | | | |
|  | water-soluble acrylic polymer | | | | | | |
|  | polyvinyl alcohol | 6 | | | | | |
| A(A2) | hydroxypropyl methyl cellulose | 0.5 | 3 | 3 | 3 | 3 | |
|  | hydroxyethyl cellulose | | | | | | |
|  | hydroxyethyl methylcellulose | | | | | | |
|  | methyl cellulose | | | | | | |
| B1 | laurate Ca | 5 | 5 | | 5 | 5 | |
|  | stearate Ca | | | | | | |
|  | oleate Ca | | | | | | |
|  | behenate Ca | | | | | | |
|  | laurate Li | | | | | | |
|  | stearate Li | | | | | | |
|  | oleate Li | | | | | | |
|  | behenate Li | | | | | | |
| B2 | laurate Zn | 1 | 1 | | 1 | | 1 |
|  | stearate Zn | | | | | | |
|  | oleate Zn | | | | | | |
|  | behenate Zn | | | | | | |
|  | laurate Mg | | | | | | |
|  | stearate Mg | | | | | | |
|  | oleate Mg | | | | | | |
|  | behenate Mg | | | | | | |
|  | laurate Al | | | | | | |
|  | stearate Al | | | | | | |
|  | oleate Al | | | | | | |
|  | montanate Al | | | | | | |
| C | coconut alcohol EO adduct | 0.5 | 0.5 | 0.5 | | 0.5 | 0.5 |
|  | sodium α-olefin sulfonate Na | 1 | 1 | 1 | | 1 | 1 |
|  | preservative | 0.2 | 0.2 | 0.2 | 0.2 | 0.2 | 0.2 |
|  | water | 85.8 | 92.3 | 95.3 | 90.8 | 90.3 | 94.3 |
|  | A ratio | 46.4 | 0.0 | 66.7 | 33.3 | 31.6 | 54.5 |
|  | B ratio | 42.9 | 80.0 | 0.0 | 66.7 | 52.6 | 18.2 |

TABLE 5-continued

|  | | | | | | |
|---|---|---|---|---|---|---|
| C ratio | 10.7 | 20.0 | 33.3 | 0.0 | 15.8 | 27.3 |
| A/B | 1.1 | 0.0 | none | 0.5 | 0.6 | 3.0 |
| B1/B2 | 5.0 | 5.0 | none | 5.0 | none | 0.0 |
| adhesion preventing properties 1 (N/cm) SBR | 0.2 | 4.5 | 0.2 | 4.0 | 0.2 | 0.2 |
| lubricity (degree) | 30-35 | 30-35 | 80-85 | 30-35 | 30-35 | 70-75 |
| viscosity (mPa · s) | 9000 | 2500 | 9000 | 22000 | 22000 | 5000 |
| dispersibility (mg/100 cm$^2$) | 0.1 | 0.1 | 0.6 | 0.1 | 0.1 | 0.1 |

As shown in Tables 2 to 5, the adhesion preventing agent compositions for unvulcanized rubber of Examples 1 to 44 all had good adhesion preventing properties, lubricity, and dispersibility. On the other hand, the adhesion preventing agent composition for unvulcanized rubber of Comparative Example 1 in which no component (A) was used had good lubricity and dispersibility, but had significantly inferior adhesion preventing properties compared to the examples. The adhesion preventing agent composition for unvulcanized rubber of Comparative Example 2 in which no component (B) was used had good adhesion preventing properties, but had significantly inferior lubricity and dispersibility compared to the examples. The adhesion preventing agent composition for unvulcanized rubber of Comparative Example 3 in which no component (C) was used had good lubricity and dispersibility, but had significantly inferior adhesion preventing properties compared to the examples. In addition, the adhesion preventing agent composition for unvulcanized rubber of Comparative Example 3 had a high viscosity of 22,000 mPa·s, and had slightly inferior handling properties compared to the examples. The adhesion preventing agent composition for unvulcanized rubber of Comparative Example 4 in which the component (B1) was used as the component (B) but the component (B2) was not used had good adhesion preventing properties, lubricity and dispersibility, but had a high viscosity of 22,000 mPa·s and therefore had slightly inferior handling properties compared to the examples. The adhesion preventing agent composition for unvulcanized rubber of Comparative Example 5 in which the component (B2) was used as the component (B) but the component (B1) was not used had good adhesion preventing properties and dispersibility, but it had significantly inferior lubricity compared to the examples.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An adhesion preventing agent composition for unvulcanized rubber, comprising:
    the following components (A) to (C) and water,
    wherein a content of water is 50 mass % or more with respect to a total mass of the adhesion preventing agent composition for unvulcanized rubber,
    wherein the following component (B) comprises the following component (B1) and the following component (B2), and
    wherein a mass ratio (B1)/(B2) of the following component (B1) and the following component (B2) is in a range of 1 to 20:
    (A) a water-soluble polymer containing nonionic cellulose ether,
    (B) a metallic soap,
    (C) a surfactant,
    (B1) at least one metallic soap selected from the group consisting of calcium fatty acid and lithium fatty acid, and
    (B2) at least one metallic soap selected from the group consisting of zinc fatty acid, magnesium fatty acid, and aluminum fatty acid.

2. The adhesion preventing agent composition for unvulcanized rubber according to claim 1,
    wherein the composition contains 25 to 70 mass % of the component (A), 20 to 60 mass % of the component (B) and 10 to 20 mass % of the component (C) with respect to a total mass 100 mass % of components other than water.

3. The adhesion preventing agent composition for unvulcanized rubber according to claim 1,
    wherein a mass ratio (A)/(B) of the component (A) and the component (B) is in a range of 0.5 to 3.

4. An unvulcanized rubber having the components (A) to (C) in the adhesion preventing agent composition for unvulcanized rubber according to claim 1 adhered to a surface of the unvulcanized rubber.

5. The adhesion preventing agent composition for unvulcanized rubber according to claim 1,
    wherein the component (C) contains an anionic surfactant.

6. The adhesion preventing agent composition for unvulcanized rubber according to claim 1,
    wherein the component (C) contains a compound of formula (1) as a nonionic surfactant:

RO-(AO)$_n$—H                (1)

In Formula (1), R represents an aliphatic hydrocarbon group having 8 to 18 carbon atoms;
    AO represents an oxyalkylene group having 2 to 4 carbon atoms, and n is an average number of moles of AO added, which is 1 to 30.

* * * * *